S. MALONE.
Hand-Seeder.
No. 10,393.
Patented Jan. 3. 1854
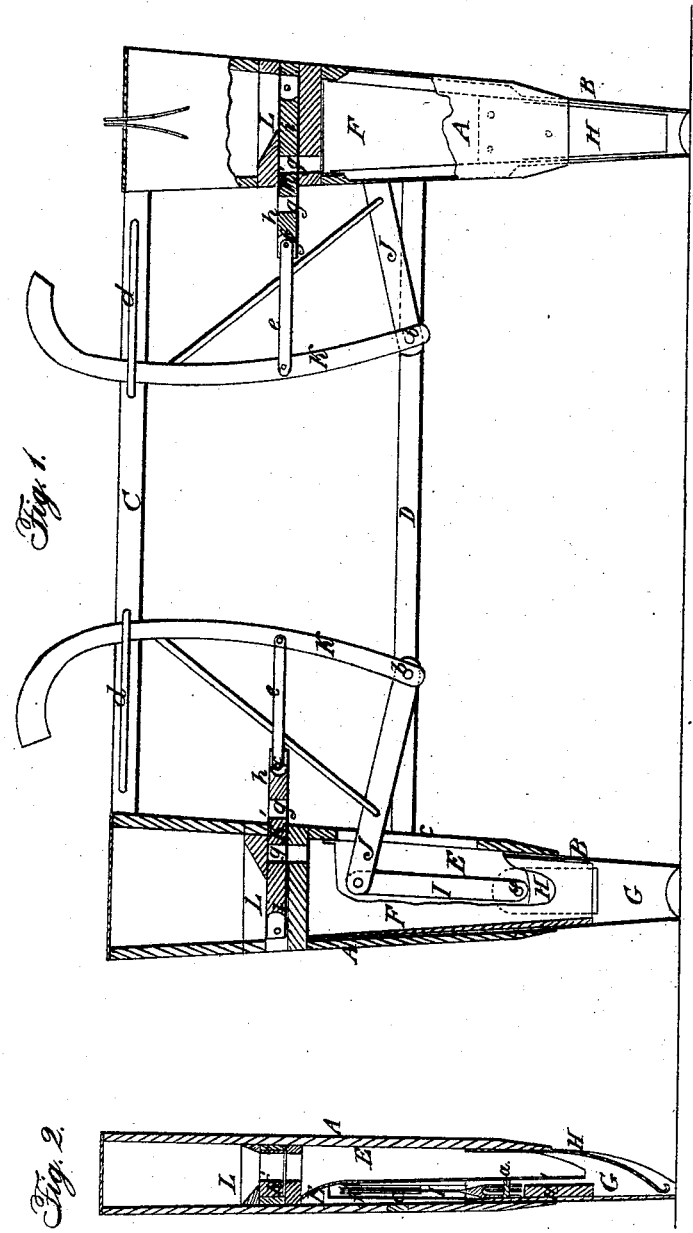

UNITED STATES PATENT OFFICE.

SAMUEL MALONE, OF TREMONT, ILLINOIS.

IMPROVEMENT IN CORN-PLANTERS.

Specification forming part of Letters Patent No. 10,393, dated January 3, 1854.

*To all whom it may concern:*

Be it known that I, SAMUEL MALONE, of Tremont, in the county of Tazewell and State of Illinois, have invented a new and useful Improvement in Hand Corn-Planters; and I do hereby declare that the following is a full, clear, and exact description of the same, reference being had to the accompanying drawings, forming part of this specification, in which—

Figure 1 is a front view of the planter. In this view one of the tubes which conduct the corn into the ground is shown in section, and parts are broken away to make arrangement of the mechanism more evident, while the other tube is shown partly in section and partly in elevation. Fig. 2 is a vertical central section of one of the tubes. This view exhibits plainly the construction of the tubes.

The same letters of reference in each of the two figures indicate corresponding parts.

This invention relates to a new and useful improvement in the manner of constructing hand corn-planters, whereby the quantity of corn planted in a hill can be regulated as desired, and the ground opened, the corn deposited into the ground and covered up in a more perfect manner and in less time than by other arrangements.

My invention consists in making the horizontal slide in such a manner that by simply detaching one of its ends from the connecting-arm and attaching its opposite end to said arm the quantity of seed deposited into the tube can be doubled in the same length of time as that required when the opposite end of the slide is attached to the connecting-arm.

To enable others to understand more fully the construction and operation of my planter, I will proceed to describe it more minutely.

A A represent two seed-tubes, made gradually tapering from their top to their lower extremity, and having metal points B B, which form the holes in the ground for the corn. These tubes are united together by the cross-pieces C D, as shown in the drawings.

E F represent the two chambers of each of said tubes, that lettered E being the chamber for the vertical slide to work in, and that F for the seed to fall through, as seen in Fig. 2. These two chambers run into one near the extremity, and thereby leave a chamber or space, G, for the seed to fall into before being discharged, as seen in Fig. 2, the spring-slide H of the metal point keeping the seed in this chamber as long as desired, and also yielding when necessary and allowing of their escape into the ground, the spring being operated upon by the vertical slide or plunger. This plunger is lettered H', and moves in the chamber E, as seen in Figs. 1 and 2. It has a vertical rod, I, jointed loosely to it at the point *a*, said rod being connected to one end of a rod or arm, J, placed in nearly a horizontal position, and attached by its other end to one of the handles K of the planter said handle having its fulcrum *b* secured in the lower cross-piece, D, at the point shown in the drawings. The arm J plays in the slot *c* of the seed-tube, as shown in the drawings. The arms and rods are jointed, and arranged and operated in a similar manner as knee-levers, the plunger having a perfectly vertical movement.

The handles of the planter are moved back and forth in the brackets *d d* when it is desired to operate the slides.

K' is the horizontal slide, working through the seed-tube under the hopper L, as seen in Figs. 1 and 2. This slide is jointed to one of the handles of the planter by the arm *e*, which turns freely on the pins *f f*. In this slide two passages, *g g'*, are formed for the corn to escape through. These holes are made nearer the end *h* than that *i*. The object of this is that the ends may be reversed, and both or one of the holes in the slide made to receive seed and deposit them into the tubes, for it will be seen that if the end *h* be attached to the arm *e* only one hole will come under the hopper, and if the end *i* be attached to said arm, both the holes will come under the hopper and over the seed-tubes, one after the other, at one movement of the slide, and thereby deposit double the quantity of corn into the tubes. The horizontal and vertical slides operate at the same time—one receiving seed while the other is discharging.

This machine is made light and portable, and is operated and carried across the field by the handles K. The farmer stands behind and in the center of the machine and lays hold of the handles with his hands, lifts and carries the machine from place to place, forms the impression in the ground by pressing the tubes downward by the handles, and then operates the slides and opens the seed-passages of the slides by drawing the handles toward his sides, and forces the seed into the ground by moving the handles from toward his sides.

What I claim as my invention, and desire to secure by Letters Patent, is—

The peculiar construction of the horizontal slide K', made reversible from end to end for the purpose of varying the quantity of seed planted, in the manner set forth and specified.

SAMUEL MALONE.

Witnesses:
J. L. SHAW,
ROWLAND CHRISTIAN.